United States Patent
Chen et al.

(10) Patent No.: US 8,666,811 B1
(45) Date of Patent: Mar. 4, 2014

(54) SYSTEMS AND METHODS FOR DETERMINING ADVERTISING ACTIVITY

(75) Inventors: Johnny Chen, Danville, CA (US); Darrell Anderson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 2695 days.

(21) Appl. No.: 10/810,725

(22) Filed: Mar. 29, 2004

(51) Int. Cl.
   *G06Q 30/00* (2012.01)
(52) U.S. Cl.
   USPC ................. 705/14.47; 705/14.26
(58) Field of Classification Search
   USPC .................................................. 705/14
   See application file for complete search history.

(56) References Cited

U.S. PATENT DOCUMENTS

| | | | |
|---|---|---|---|
| 6,792,399 B1 * | 9/2004 | Phillips et al. | 705/36 R |
| 7,933,984 B1 * | 4/2011 | Smith et al. | 709/224 |
| 8,311,890 B2 * | 11/2012 | Donovan et al. | 705/14.73 |
| 2004/0148222 A1 * | 7/2004 | Sabella et al. | 705/14 |
| 2004/0181525 A1 * | 9/2004 | Itzhak et al. | 707/5 |
| 2004/0186778 A1 * | 9/2004 | Margiloff et al. | 705/14 |
| 2005/0004835 A1 * | 1/2005 | Roslansky et al. | 705/14 |
| 2005/0144067 A1 * | 6/2005 | Farahat et al. | 705/14 |
| 2008/0235083 A2 * | 9/2008 | Bosarge et al. | 705/14 |
| 2008/0310608 A1 * | 12/2008 | Johnson et al. | 379/112.01 |

OTHER PUBLICATIONS

Co-pending U.S. Appl. No. 10/375,900, filed Feb. 26, 2003, titled "Serving Advertisements Based on Content," Darrell Anderson et al., 47 page specification, 11 sheets of drawings.

* cited by examiner

*Primary Examiner* — John G Weiss
*Assistant Examiner* — Christopher Stroud
(74) *Attorney, Agent, or Firm* — Harrity & Harrity, LLP (57) ABSTRACT

A system may provide an advertising link in association with a document. The content of the advertising link is unrelated to a content of the document. The system may also determine a rate at which the advertising link is selected and determine whether illegitimate activity occurred based, at least in part, on the determined rate of selection.

28 Claims, 5 Drawing Sheets

SYSTEMS AND METHODS FOR DETERMINING ADVERTISING ACTIVITY

FIELD OF THE INVENTION

Systems and methods consistent with the principles of the invention relate generally to advertising and, more particularly, to systems and methods for processing advertising information received in a communications network.

BACKGROUND OF THE INVENTION

An on-line advertising system may provide advertising links (also referred to as "impressions" hereinafter) to users when they visit certain web pages. When a particular advertising link is of interest to a user, a user may select (or click) the advertising link, which may cause the user's web browser to visit a web page belonging to the advertiser associated with the advertising link. This selection of an advertising link by a user is referred to hereinafter as a "click."

On-line advertising systems often track impressions and clicks, and calculate charges based thereon. For example, an on-line advertising system may calculate a charge based, at least in part, on the clicks that an advertising link receives. Charges may also be calculated based, at least in part, on other characteristics as well, such as time of day, location of the user, age or other demographic information associated with the user, or the like.

On-line advertising systems may charge companies a predetermined fee for each click associated with the companies' advertisements. The on-line advertising system may also pay a fee to the web publisher that displays an advertising link for each click that the advertising link receives. These types of fee approaches are vulnerable to attacks where malicious individuals inflate a company's advertising link click count. For example, malicious individuals may continually cause the company's advertisement(s) to be displayed, physically click on the company's advertisement(s), and/or write programs (often called click-bots) that automatically generate page views and clicks. These click-bots can be configured to mimic real network traffic by specifying parameters, such as clicks to page view distributions, geographic locations and network addresses, amount of traffic by days of the week and time of day, etc.

When malicious advertising click activity occurs, a company may be charged for clicks that do not correspond to actual (or real) users. This can result in inaccurate fees being charged for advertising services. In those situations where web publishers are paid a fee each time a displayed advertising link is clicked, the web publishers themselves may use click-bots to increase their revenue from the on-line advertising systems.

Accordingly, there exists a need for systems and methods capable of detecting illegitimate advertising click activity.

SUMMARY OF THE INVENTION

In accordance with one implementation consistent with the principles of the invention, a method may include providing a group of advertising links in association with a document, where an advertising link in the group of advertising links is related to a content of the document and another advertising link in the group of advertising links is unrelated to the content of the document; determining a first rate at which the related advertising link is selected; determining a second rate at which the unrelated advertising link is selected; comparing the first rate to the second rate; and determining whether illegitimate advertising-related activity occurred based, at least in part, on a result of the comparing.

In another implementation consistent with the principles of the invention, a system may include a memory to store advertising links, and a processor. The processor provides a group of advertising links, where each of the advertising links in the group is related by a topic, provides an advertising link that is unrelated to the group, tracks a rate of selection of the group of related advertising links, tracks a rate of selection of the unrelated advertising link, and determines whether illegitimate activity occurred based, at least in part, on the rate of selection of the group of related advertising links and the rate of selection of the unrelated advertising link.

In yet another implementation consistent with the principles of the invention, a method may include providing a group of advertising links via a graphical user interface, where an advertising link in the group of advertising links is related to a content of the graphical user interface and another advertising link in the group of advertising links is unrelated to the content of the graphical user interface. The unrelated advertising link is positioned in proximity to the related advertising link on the graphical user interface. The method may further include determining a first click-through rate for the related advertising link, determining a second click-through rate for the unrelated advertising link, comparing the first click-through rate to the second click-through rate, and determining that illegitimate advertising-related activity occurred when the second click-through rate substantially equals the first click-through rate.

In still another implementation consistent with the principles of the invention, a system includes logic to provide an advertising link in association with a document, where a content of the advertising link is unrelated to a content of the document; logic to detect a rate at which the advertising link is selected; and logic to determine whether illegitimate activity occurred based, at least in part, on the rate.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Implementations consistent with the principles of the invention detect illegitimate advertising click activity. In this way, advertising-related charges can be more accurately determined.

In one exemplary implementation, an advertising link that is unrelated to the content of a displayed web page is provided in addition to a group of related advertising links. The related advertising links are referred to hereinafter as "relevant advertising links," while the unrelated advertising link is referred to as an "irrelevant advertising link."

One difference between a click-bot's click or a malicious individual's click (e.g., a click from someone paid to click on advertising links) of an advertising link and a normal user's click of an advertising link is that the normal user's click is often the result of reading the advertising link, understanding it, and finding it interesting enough to click on it to find out additional information regarding the advertising link's content. In stark contrast, a click-bot's selection of advertising links is often based purely on some probabilistic distribution and may be indiscriminate of the content of the advertising link. Similarly, a malicious individual's selection of an advertising link may be indiscriminate of the content of the advertising links presented to the individual.

Since some click-bots cannot distinguish between relevant and irrelevant advertising links, a click-bot is just as likely to click an irrelevant advertising link as a relevant advertising link. Moreover, a malicious individual may be just as likely to click an irrelevant advertising link as a relevant advertising link. By monitoring the click-through rate (i.e., the average number of clicks that an advertising link receives per 100 impressions of the advertising link) of the irrelevant advertising links and comparing that rate to the click-through rate of the relevant advertising links, illegitimate advertising click activity can be detected.

Exemplary System

Figure 1:
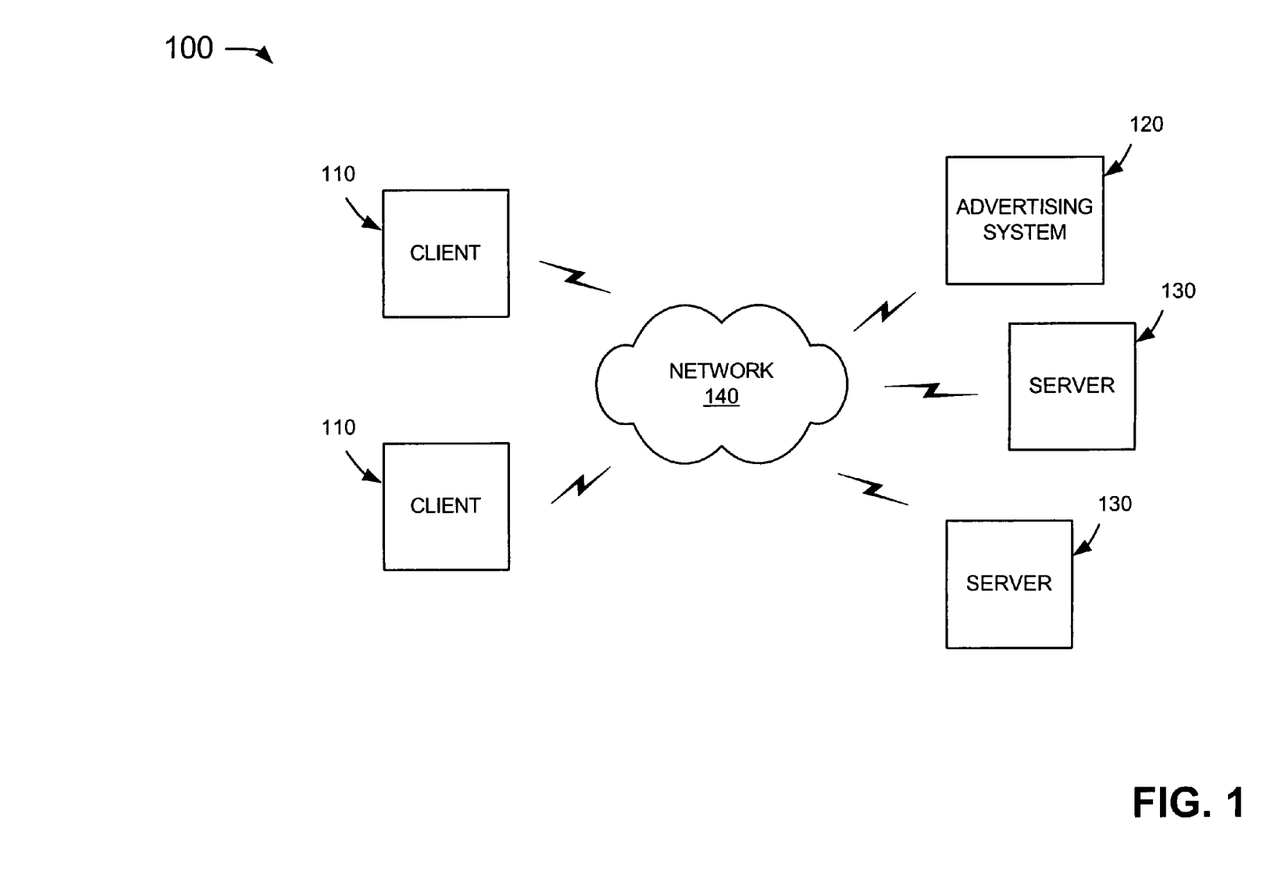
FIG. 1 is an exemplary diagram of a system in which systems and methods consistent with the principles of the invention may be implemented.

FIG. 1 is an exemplary diagram of a system 100 in which systems and methods consistent with the principles of the invention may be implemented. System 100 may include multiple clients 110, an advertising system 120, and servers 130 connected via a network 140. Network 140 may include a local area network (LAN), a wide area network (WAN), a telephone network, such as the Public Switched Telephone Network (PSTN), an intranet, the Internet, a similar or dissimilar network, or a combination of networks. Two clients 110, one advertising system 120, and two servers 130 have been illustrated as connected to network 140 in FIG. 1 for simplicity. In practice, there may be more or fewer clients 110, advertising systems 120, and/or servers 130. Also, in some instances, a client 110 may perform the functions of advertising system 120 and/or server 130 and vice versa.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Advertising system 120 may include a server entity that maintains and provides advertising links. Servers 130 may include server entities that gather, process, search, and/or maintain documents in a manner consistent with the principles of the invention. Clients 110, advertising system 120, and servers 130 may connect to network 140 via wired, wireless, and/or optical connections.

In an implementation consistent with the principles of the invention, servers 130 may optionally include a search engine (not shown) usable by clients 110. Servers 130 may crawl documents (e.g., web pages) and store information associated with these documents in a repository of crawled documents. While advertising system 120 and servers 130 are shown as separate entities, it may be possible for one or more of servers 130 to perform one or more of the functions of advertising system 120, and vice versa. For example, it may be possible to implement advertising system 120 and one or more of servers 130 as a single server. It may also be possible to implement advertising system 120 as multiple, possibly distributed, entities.

Exemplary Advertising System Configuration

Figure 2:
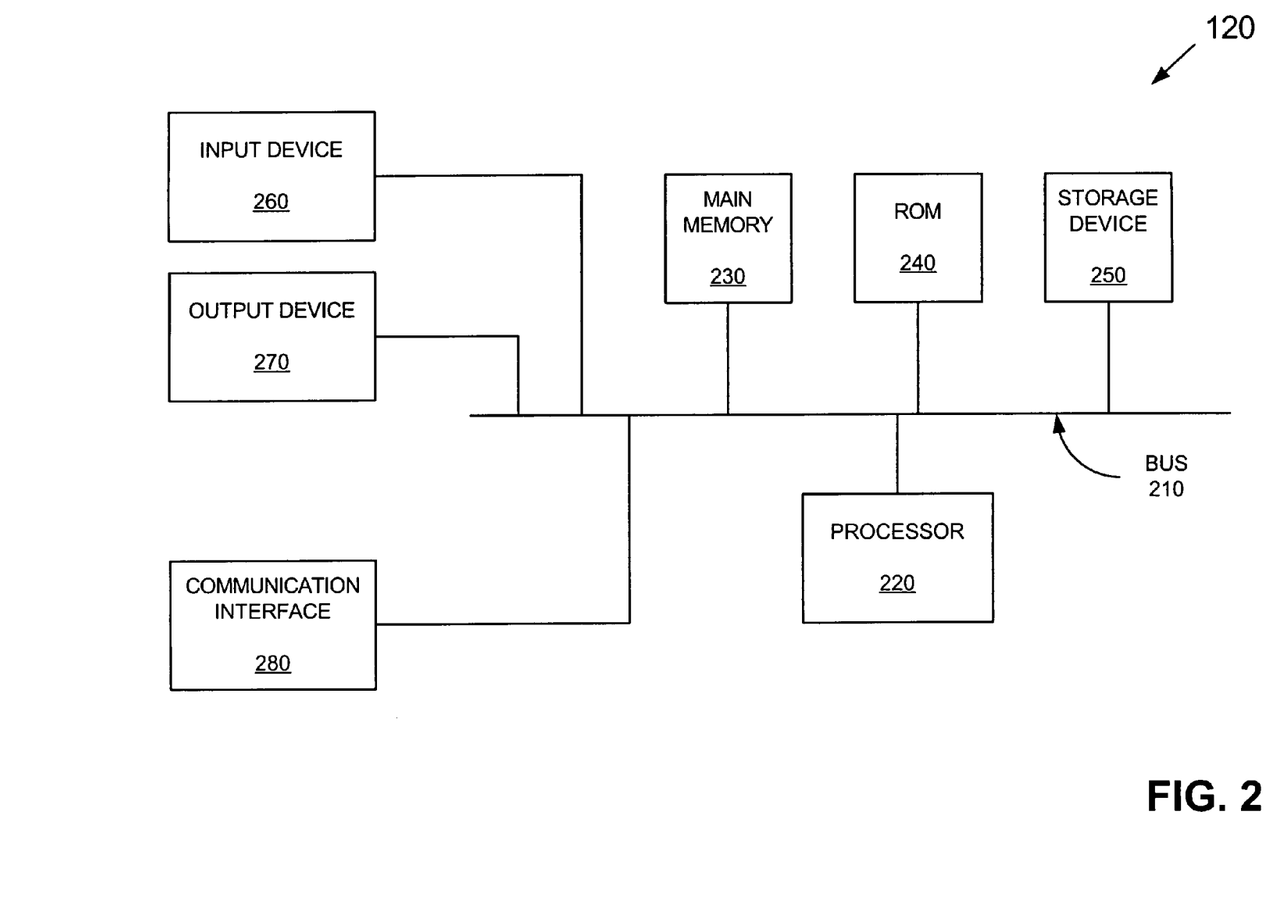
FIG. 2 is an exemplary diagram of the advertising system of FIG. 1 in an implementation consistent with the principles of the invention.

FIG. 2 is an exemplary diagram of advertising system 120 in an implementation consistent with the principles of the invention. Clients 110 and servers 130 may be similarly configured. Advertising system 120 may include a bus 210, a processor 220, a main memory 230, a read only memory (ROM) 240, a storage device 250, an input device 260, an output device 270, and a communication interface 280. Bus 210 may include a set of conductors that permit communication among the components of advertising system 120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits a user to input information to advertising system 120, such as a keyboard, a mouse, a pen, a biometric mechanism, such as a voice recognition device, etc. Output device 270 may include a conventional mechanism that outputs information to the user, including a display, a printer, a speaker, etc. Communication interface 280 may include any transceiver-like mechanism that enables advertising system 120 to communicate with other devices and/or systems. For example, communication interface 280 may include mechanisms for communicating with another device or system via a network, such as network 140.

As will be described in detail below, advertising system 120, consistent with the principles of the invention, may detect illegitimate advertising click activity. Advertising system 120 may perform this and other operations in response to processor 220 executing software instructions contained in a computer-readable medium, such as memory 230. A computer-readable medium may be defined as a memory device and/or carrier wave. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the invention are not limited to any specific combination of hardware circuitry and software.

Exemplary Processing

Figure 3:
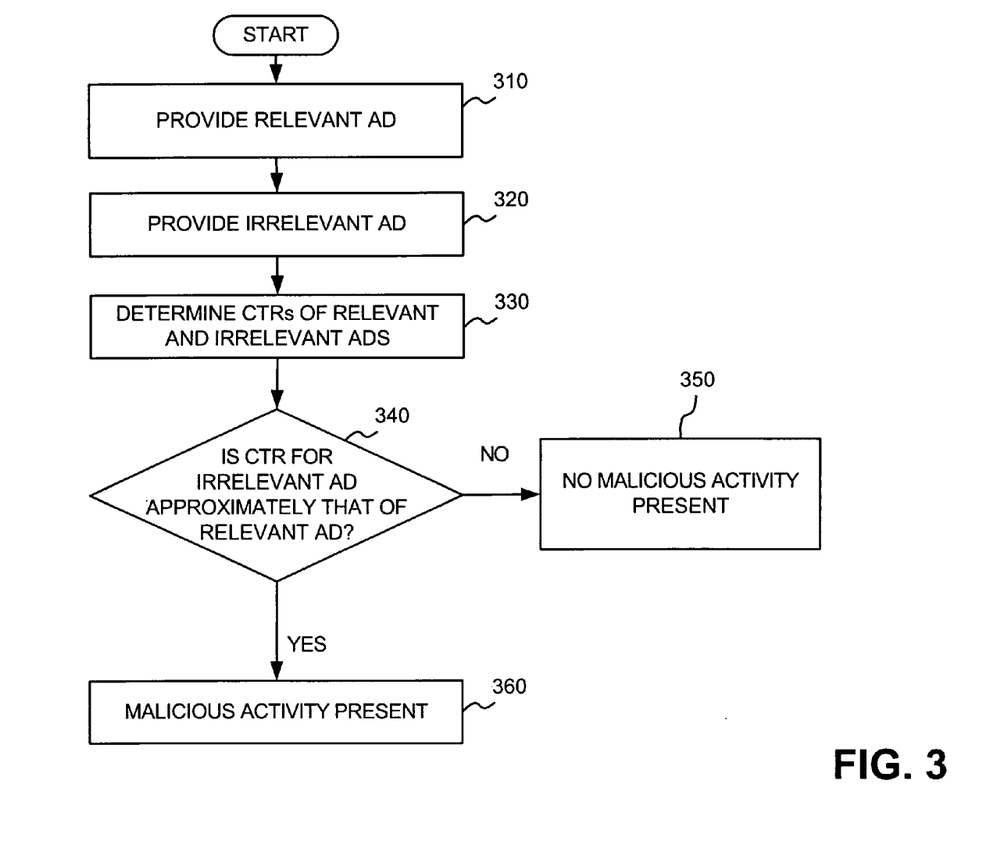
FIG. 3 is a flow chart of an exemplary process for detecting illegitimate advertising click activity in an implementation consistent with the principles of the invention.

FIG. 3 is a flow chart of an exemplary process for detecting illegitimate advertising click activity in an implementation consistent with the principles of the invention. Processing may begin by providing a number of relevant advertising links (act 310). A relevant advertising link may be provided to a client 110 or a server, such as server 130, for providing to a client 110. In one implementation consistent with the principles of the invention, the relevant advertising link may, for example, be provided in response to a search query from a client 110. In this situation, the relevant advertising link may relate to the terms in the search query. For example, if the search query contains the term "flowers," an advertising link relating to buying flowers over the Internet may be provided as a relevant advertising link. The search query may be received at a search engine associated with advertising system 120 or another device (e.g., server 130) in system 100.

In another implementation, the relevant advertising link may be provided in response to a client 110 accessing a document (e.g., a web page) provided by advertising system 120 and/or server 130. In this situation, the content of the relevant advertising link may relate to the content of the document. For example, if a user of client 110 accesses a document relating to flowers, an advertising link relating to buying flowers over the Internet may be provided as a relevant advertising link. The selection of an appropriate relevant advertising link to provide may, for example, be determined by identifying a keyword that represents the content of the document and using the keyword to select the appropriate relevant advertising link. One technique for providing an advertising link based, at least in part, on the content of a document (or web page) is described in U.S. patent application Ser. No. 10/375,900, entitled "Serving Advertisements Based on Content," and filed Feb. 26, 2003, the entire contents of which are expressly incorporated herein by reference.

In addition to providing a number of relevant advertising links, a number of irrelevant advertising links may simultaneously be provided (act 320). The content of an irrelevant advertising link may be unrelated to the content of the graphical user interface to which the irrelevant advertising link is provided. For example, if the content of the graphical user interface relates to buying flowers via a network, the content of the relevant advertising link may relate to buying flowers via a network, while the content of the irrelevant advertising link may be totally unrelated to buying flowers via a network. In this situation, the content of the irrelevant advertising link may, for example, be directed to any topic unrelated to buying flowers. For example, an irrelevant advertising link could be directed to car repair (or any other topic that is unrelated to buying flowers via a network). In one implementation, the irrelevant advertising link may be directed to charities, as long as the content of the graphical user interface on which the irrelevant advertising link appears is not directed to charities with which the irrelevant advertising link relates.

The click-through rates (CTRs) of the relevant and irrelevant advertising links may be determined (act 330). The click-through rate of an advertising link may be determined by dividing the number of clicks that the advertising link receives by the number of impressions of the advertising link (i.e., the number of times that the advertising link has been provided). In one implementation, the click-through rate may be indicated as a percentage.

As set forth above, it is expected that when relevant and irrelevant advertising links are presented simultaneously to normal users, the click-through rate of the irrelevant advertising link should be significantly lower than the click-through rate of the relevant advertising link. In contrast, when clock-bots or malicious individuals are used for selecting advertising links, the click-through rate of the irrelevant advertising link should be roughly the same as the click-through rate of the relevant advertising link due to the fact that click-bots do not distinguish advertising links based on their content.

The click-through rate of the irrelevant advertising link may then be compared to the click-through rate of the relevant advertising link (act 340). If the click-through rate of the irrelevant advertising link does not approximately equal the click-through rate of the relevant advertising link (e.g., the click-through rate of the irrelevant advertising link is not within a predefined range of the click-through rate of the relevant advertising link) (act 340), it may be determined that no malicious activity has occurred (act 350). If, on the other hand, the click-through rate of the irrelevant advertising link approximately equals the click-through rate of the relevant advertising link, then it may be determined that malicious activity has occurred (act 360). In this event, remedial measures may be taken. For example, a fee paid to a web publisher that provides the advertising links may be reduced. Moreover, the number of clicks on a relevant advertising link that was provided at the same time (or during the same time period) as the irrelevant advertising link having the click-through rate that approximately equals the click-through rate of the relevant advertising link may be further analyzed. In some cases, a fee paid for clicks on a relevant advertising link may also be reduced in response to determining that malicious activity occurred.

Figure 4:
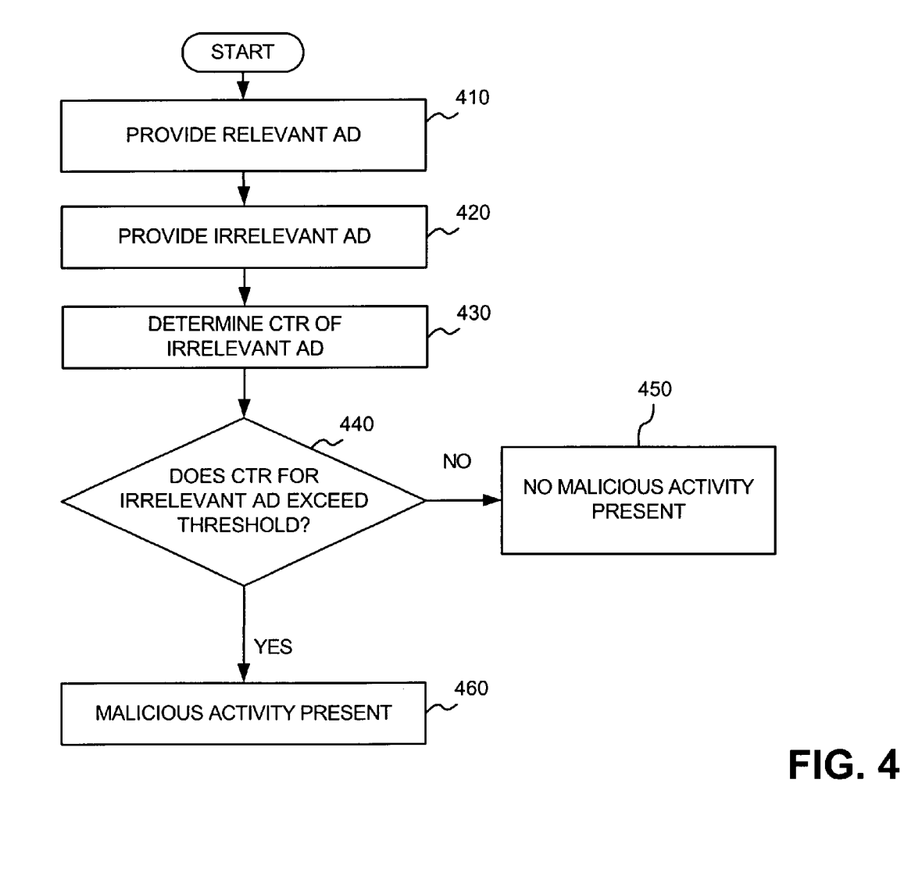
FIG. 4 is a flow chart of an exemplary process for detecting illegitimate advertising click activity in an alternative implementation consistent with the principles of the invention.

FIG. 4 is a flow chart of an exemplary process for detecting illegitimate advertising click activity in an alternative implementation consistent with the principles of the invention. Processing may begin by providing a number of relevant advertising links (act 410). A relevant advertising link may be provided to a client 110 or a server, such as server 130, for providing to a client 110. In one implementation consistent with the principles of the invention, the relevant advertising link may, for example, be provided in response to a search query from a client 110. In this situation, the relevant advertising link may relate to the terms in the search query. In another implementation, the relevant advertising link may be provided in response to a client 110 accessing a web page associated with advertising system 120 and/or server 130. In this situation, the content of the advertising link may relate to the content of the web page.

In addition to providing a number of relevant advertising links, a number of irrelevant advertising links may simultaneously be provided (act 420). The content of an irrelevant advertising link may be unrelated to the content of the graphical user interface to which the irrelevant advertising link is provided. In one implementation, an advertising link directed to an unrelated topic and having a known low click-through rate (CTR) may be selected. For example, advertising links directed to conducting surveys may be known to have low click-through rates.

The click-through rate of the irrelevant advertising link may be determined (act 430). As set forth above, the click-through rate of an advertising link may be determined by dividing the number of clicks that the advertising link receives by the number of impressions of the advertising link (i.e., the number of times that the advertising link has been provided). In one implementation, the click-through rate may be indicated as a percentage.

The click-through rate of the irrelevant advertising link may be compared to a threshold (act 440). The threshold may be configurable and set to approximately equal or exceed the known click-through rate of the irrelevant advertising link. For example, if the click-through rate of the irrelevant advertising link is known to be roughly 1%, the threshold may be set to be approximately 3% (or some other value that is slightly higher than 1%). In one implementation, the threshold may be selected by, for example, monitoring the click-through rate of the irrelevant advertising link over a period of time. Alternatively, the threshold may be a function of a relevant advertising link click-through rate. If the click-through rate of a relevant advertising link provided with the irrelevant advertising link is 1%, then the threshold may be set to some value lower than 1%.

If the click-through rate of the irrelevant advertising link is less than or equals the threshold (act 440), it may be determined that no malicious activity has occurred (act 450). If, on the other hand, the click-through rate of the irrelevant advertising link exceeds the threshold, then it may be determined that malicious activity has occurred (act 460). In this event, remedial measures may be taken. For example, a fee paid to a web publisher that provides the advertising links may be reduced. Moreover, the number of clicks on a relevant advertising link that was provided at the same time (or during the same time period) as the irrelevant advertising link may be further analyzed. In some cases, a fee paid for clicks on a relevant advertising link may also be reduced in response to determining that malicious activity occurred.

Figure 5:
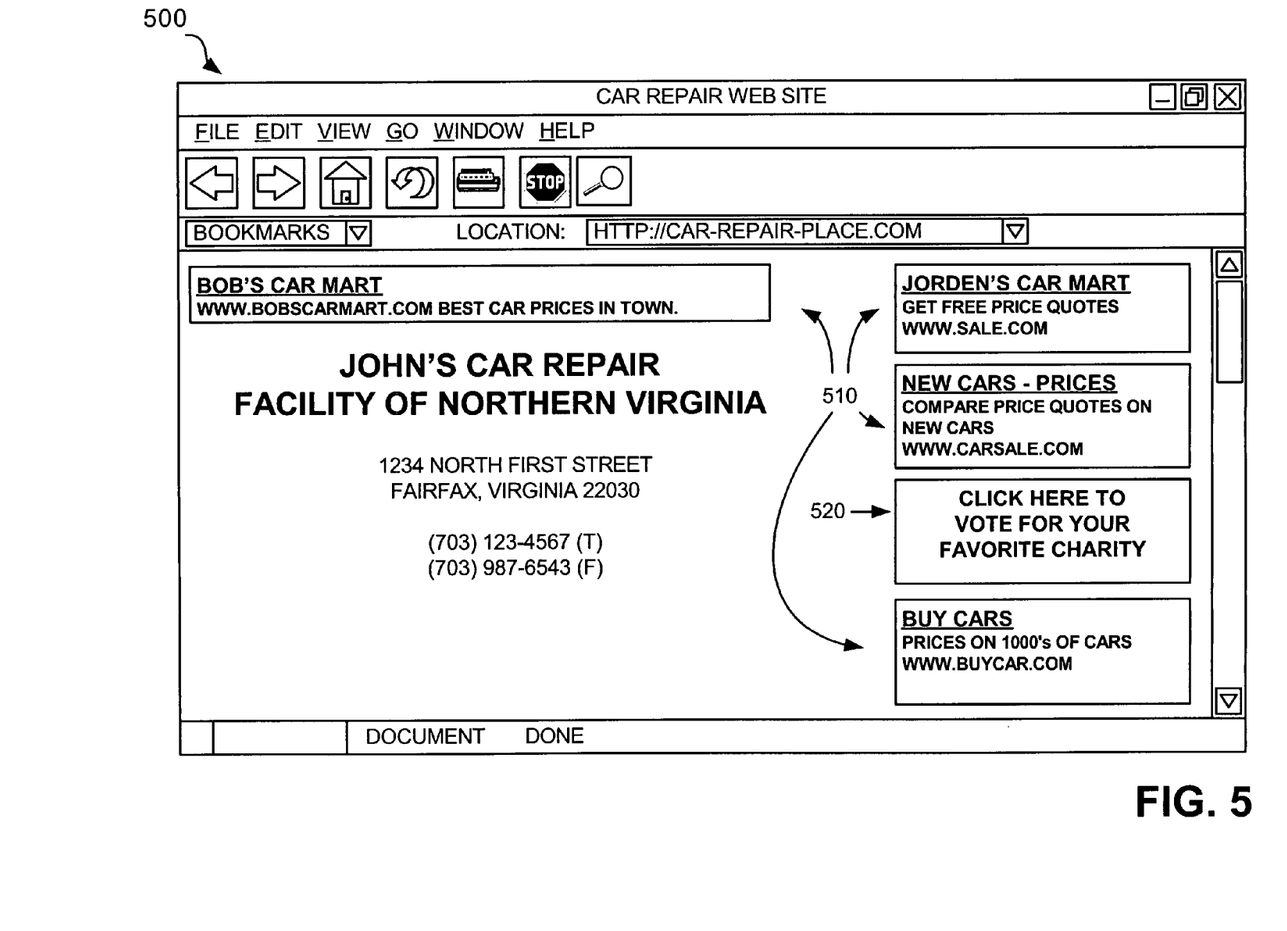
FIG. 5 illustrates an exemplary graphical user interface in an implementation consistent with the principles of the invention.

The following example illustrates the above processes. FIG. 5 illustrates an exemplary graphical user interface 500 in an implementation consistent with the principles of the invention. Graphical user interface 500 may be accessed, for example, by typing in the uniform resource locator (URL) "car-repair-place.com" or in response to a search query. In the example illustrated in FIG. 5, the content of graphical user interface 500 relates to car repair.

As illustrated, graphical user interface 500 may provide a number of relevant advertising links 510 and a number of irrelevant advertising links 520 (one irrelevant advertising link is illustrated in FIG. 5 for explanatory purposes only). Advertising links 510 may be selected based, at least in part, on, for example, the content of graphical user interface 500 (car repair in this example), the geographical area of a user to which graphical user interface 500 is provided, and/or other criteria. In the example illustrated in FIG. 5, relevant advertising links 510 relate to cars.

The content of irrelevant advertising link 520, on the other hand, is unrelated to car repair or cars, in general. As illustrated, the content of irrelevant advertising link 520 is directed to voting for your favorite charity. In one implementation, irrelevant advertising link 420 may be positioned in proximity to relevant advertising links 410. In other implementations, irrelevant advertising link 420 may be positioned away from relevant advertising links 410 so as to reduce the chances that irrelevant advertising link 420 is inadvertently clicked.

As set forth above, certain click-bots cannot distinguish between the content of advertising links and malicious individuals do not typically distinguish between advertising links based on content. Therefore, when click-bots or malicious individuals are used to inflate advertising link click counts, the click-bots and malicious individuals may be just as likely to click an irrelevant advertising link as they are to click a relevant advertising link. In this way, the use of malicious advertising click activity can be easily detected.

CONCLUSION

Implementations consistent with the principles of the invention detect illegitimate advertising click activity. In this way, advertising-related charges can be more accurately determined.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focuses on providing a relevant advertising link and an irrelevant advertising link (e.g., an advertising link that is expected to receive a low number of clicks), implementations consistent with the principles of the invention are not so limited. For example, an advertising link may be provided, in addition to a relevant advertising link, that is expected to have a high click-through rate. This type of advertising link is referred to hereinafter as a "high profile advertising link." An example of a high profile advertising link may be one that indicates "click here and win $10,000!" Therefore, in this exemplary situation, when a relevant advertising link is presented simultaneously with a high profile advertising link, it is expected that the click-through rate of the high profile advertising link should be higher than the click-through rate of the relevant advertising link. In contrast, when click-bots or malicious individuals are used for selecting advertising links, the click-through rate of the high profile advertising link should be roughly the same as the click-through rate of the relevant advertising link due to the fact that many click-bots do not distinguish advertising links based on their content. By observing the click-through rates of the relevant advertising link and high profile advertising link, illegitimate advertising click activity can be detected.

One or more of the acts described with respect to FIGS. 3 and 4 may be performed by advertising system 120 or another device (or combination of devices) in system 100. In one implementation, one or more of the acts described with respect to FIGS. 3 and 4 may be performed by a client 110 or a server, such as one of servers 130. For example, a browser assistant (i.e., software that operates in conjunction with a conventional web browser) may perform one or more of the acts described with respect to the processes of FIGS. 3 and 4.

Moreover, while series of acts have been described with regard to FIGS. 3 and 4, the order of the acts may be varied in other implementations consistent with the principles of the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the description of the implementations consistent with the principles of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by one or more devices, comprising:

providing, by one or more processors of the one or more devices, a group of advertising links in association with a document,
  a related advertising link in the group of advertising links being related to a content of the document, and
  an unrelated advertising link in the group of advertising links being unrelated to the content of the document;
determining, by one or more processors of the one or more devices, a first rate at which the related advertising link is selected;
determining, by one or more processors of the one or more devices, a second rate at which the unrelated advertising link is selected;
determining, by one or more processors of the one or more devices, a result of comparing the first rate, at which the related advertising link is selected, to the second rate, at which the unrelated advertising link is selected; and
determining, by one or more processors of the one or more devices, whether illegitimate advertising-related activity occurred based on the result of the comparing.

2. The method of claim 1,
where determining the result of the comparing comprises:
  determining whether the second rate is within a range of the first rate, and
where determining whether the illegitimate advertising-related activity occurred comprises:
  determining that the illegitimate advertising-related activity occurred when the second rate is determined to be within the range of the first rate.

3. The method of claim 2, further comprising:
adjusting an advertising payment amount when the illegitimate advertising-related activity occurred.

4. The method of claim 1, where the illegitimate advertising-related activity includes a use of a program to automatically click advertising links.

5. The method of claim 1, where providing the group of advertising links comprises:
  determining a concept associated with the document, and
  providing the group of advertising links based on the determined concept.

6. The method of claim 5, where the related advertising link is selected based on the determined concept.

7. The method of claim 1, further comprising:
identifying, prior to providing the group of advertising links, the related advertising link, in the group of advertising links, that is related to the content of the document; and
identifying, prior to providing the group of advertising links, the unrelated advertising link, in the group of advertising links, that is unrelated to the content of the document.

8. A system comprising:
one or more devices to:
  provide advertising links in association with a document,
    a related advertising link of the advertising links being related to a content of the document, and
    an unrelated advertising link of the advertising links being unrelated to the content;
  determine a first rate at which the related advertising link is selected;
  determine a second rate at which the unrelated advertising link is selected;
  compare the first rate, at which the related advertising link is selected, to the second rate, at which the unrelated advertising link is selected; and
  determine whether illegitimate activity occurred based on the comparing.

9. A device comprising:
a memory to store instructions; and
a processor to execute the instructions to:
  provide a related advertising link that is related to a content of a document,
  provide an unrelated advertising link that is unrelated to the content,
  track a first rate at which the related advertising link is selected,
  track a second rate at which the unrelated advertising link is selected,
  compare the first rate, at which the related advertising link is selected, to the second rate, at which the unrelated advertising link is selected, and
  determine whether illegitimate activity occurred based on the comparing.

10. The device of claim 9, where the processor is further to execute the instructions to:
  simultaneously provide multiple advertising links that are unrelated to the content of the document,
    the multiple advertising links including the unrelated advertising link.

11. The device of claim 9,
where, when providing the related advertising link, the processor is to:
  provide the related advertising link via a graphical user interface, and
where, when providing the unrelated advertising link, the processor is to:
  provide the unrelated advertising link in proximity to the related advertising link on the graphical user interface.

12. A non-transitory computer-readable memory device comprising instructions, the instructions comprising:
one or more instructions that, when executed by at least one processor, cause the at least one processor to:
  provide a related advertising link that is related to a content of a document;
  provide an unrelated advertising link that is unrelated to the content;
  track a first rate at which the related advertising link is selected;
  track a second rate at which the unrelated advertising link is selected;
  compare the first rate, at which the related advertising link is selected, to the second rate, at which the unrelated advertising link is selected, and
  determine whether illegitimate activity occurred based on the comparing.

13. The non-transitory computer-readable memory device of claim 12, where the first rate and the second rate include click-through rates.

14. The non-transitory computer-readable memory device of claim 12, where the document is selected based on a keyword.

15. A method, performed by one or more devices, comprising:
providing, by one or more processors of the one or more devices, a first advertising link relating to a topic;
providing, by one or more processors of the one or more devices, a second advertising link unrelated to the topic;
tracking, by one or more processors of the one or more devices, a rate of selection of the first advertising link;

tracking, by one or more processors of the one or more devices, a rate of selection of the second advertising link; and determining, by one or more processors of the one or more devices, whether illegitimate activity occurred based on a comparison of the rate of selection of the first advertising link to the rate of selection of the second advertising link.

16. The method of claim 15,
where tracking the rate of selection of the first advertising link comprises:
   tracking a click-through rate for the first advertising link, and
where tracking the rate of selection of the second advertising link comprises:
   tracking a click-through rate for the second advertising link.

17. The method of claim 15, where determining whether the illegitimate activity occurred comprises:
   determining a result of the comparison of the rate of selection of the first advertising link to the rate of selection of the second advertising link, and
   determining whether the illegitimate activity occurred based on the result of the comparison.

18. The method of claim 15, where determining whether the illegitimate activity occurred comprises:
   determining that the illegitimate activity occurred when the rate of selection of the first advertising link is within a range of the rate of selection of the second advertising link.

19. A system comprising:
   a memory to store advertising links; and
   a processor to:
      provide related advertising links,
         each of the related advertising links being related to a topic,
      provide an unrelated advertising link that is unrelated to the topic,
      track a rate of selection of the related advertising links,
      track a rate of selection of the unrelated advertising link, and
      determine whether illegitimate activity occurred based on a comparison of the rate of selection of the related advertising links to the rate of selection of the unrelated advertising link.

20. The system of claim 19, where the processor is further to:
   adjust an advertising fee when the illegitimate activity is occurred.

21. The system of claim 19,
where the processor, when providing the related advertising links, is to:
   provide the related advertising links via a graphical user interface, and
where the processor, when providing the unrelated advertising link that is unrelated to the topic, is to:
   provide the unrelated advertising link that is unrelated to the topic via the graphical user interface.

22. A non-transitory computer-readable memory device comprising instructions, the instructions comprising:
   a one or more instructions that, when executed by at least one processor, cause the at least one processor to:
      providing groups of provide related advertising links,
         each of the related advertising links being related to a topic;
      provide an unrelated advertising link that is unrelated to the topic;
      determine a rate of selection of the group of related advertising links,
      determine a rate of selection of the unrelated advertising link, and
      determine whether illegitimate activity occurred based on a comparison of the rate of selection of the related advertising links to the rate of selection of the unrelated advertising link.

23. The non-transitory computer-readable memory device of claim 22, where the one or more instructions to provide the unrelated advertising link that is unrelated to the topic comprise:
   one or more instructions that, when executed by the at least one processor, cause the at least one processor to:
      position the unrelated advertising link that is unrelated to the topic in proximity to an advertising link of the related advertising links.

24. The non-transitory computer-readable memory device of claim 22, where the one or more instructions to provide the related advertising links comprise:
   one or more instructions that, when executed by the at least one processor, cause the at least one processor to:
      provide the related advertising links in association with a document.

25. The non-transitory computer-readable memory device of claim 24, where a content of the document relates to the topic.

26. The non-transitory computer-readable memory device of claim 24, where a particular advertising link, of the related advertising links, is selected based on a keyword.

27. The non-transitory computer-readable memory device of claim 26, where the document is selected based on the keyword.

28. A method, performed by one or more devices, comprising:
   providing, by one or more processors of the one or more devices, a group of advertising links via a graphical user interface,
      a related advertising link in the group of advertising links being related to a content of the graphical user interface, and
      an unrelated advertising link in the group of advertising links being unrelated to the content of the graphical user interface,
      the unrelated advertising link being positioned in proximity to the related advertising link on the graphical user interface;
   determining, by one or more processors of the one or more devices, a first click-through rate for the related advertising link;
   determining, by one or more processors of the one or more devices, a second click-through rate for the unrelated advertising link;
   comparing, by one or more processors of the one or more devices, the first click-through rate, for the related advertising link, to the second click-through rate, for the unrelated advertising link; and
   determining, by one or more processors of the one or more devices, that illegitimate advertising-related activity occurred when the second click-through rate is within a range of the first click-through rate.

* * * * *